United States Patent
Khartabil et al.

(10) Patent No.: US 7,526,281 B2
(45) Date of Patent: Apr. 28, 2009

(54) METHOD AND DEVICE FOR ESTABLISHING A CONFERENCE CALL BETWEEN A PLURALITY OF USER TERMINALS OF A COMMUNICATION NETWORK

(75) Inventors: Hisham Khartabil, Helsinki (FI); Markus Isomäki, Espoo (FI); Aki Niemi, Helsinki (FI); Simo Veikkolainen, Espoo (FI)

(73) Assignee: Nokia Corporation, Espoo (FI)

( * ) Notice: Subject to any disclaimer, the term of this patent is extended or adjusted under 35 U.S.C. 154(b) by 347 days.

(21) Appl. No.: 10/936,680

(22) Filed: Sep. 9, 2004

(65) Prior Publication Data

US 2005/0260976 A1 Nov. 24, 2005

(30) Foreign Application Priority Data

May 20, 2004 (GB) .................................. 0411278.5

(51) Int. Cl.
*H04M 3/42* (2006.01)
(52) U.S. Cl. ........................ 455/416; 455/519; 455/518; 455/413; 455/415
(58) Field of Classification Search ................. 455/416, 455/414.1–4, 518, 519, 413, 426.1, 415
See application file for complete search history.

(56) References Cited

U.S. PATENT DOCUMENTS

| | | | | |
|---|---|---|---|---|
| 5,978,669 A | * | 11/1999 | Sanmugam | .................. 455/410 |
| 6,665,392 B1 | * | 12/2003 | Wellner et al. | ......... 379/204.01 |
| 6,760,423 B1 | * | 7/2004 | Todd | ..................... 379/202.01 |
| 6,961,416 B1 | * | 11/2005 | Summers et al. | ....... 379/202.01 |
| 2002/0004383 A1 | * | 1/2002 | Koskinen et al. | ............ 455/414 |
| 2002/0009990 A1 | * | 1/2002 | Kleier et al. | ................. 455/416 |
| 2002/0123331 A1 | * | 9/2002 | Lehaff et al. | ................. 455/414 |
| 2002/0173319 A1 | * | 11/2002 | Fostick | ........................ 455/466 |
| 2003/0058806 A1 | * | 3/2003 | Meyerson et al. | ........... 370/260 |
| 2004/0193683 A1 | * | 9/2004 | Blumofe | ..................... 709/204 |
| 2004/0203944 A1 | * | 10/2004 | Huomo et al. | ............... 455/466 |
| 2004/0218744 A1 | * | 11/2004 | Nguyen et al. | ......... 379/202.01 |

OTHER PUBLICATIONS

Rosenberg, J., Dynamicsoft; "An Extensible Markup Language (XML) Format for Representing Resource Lists", IETF Standard Working Draft, Internet Engineering Task Force, CH, vol. simple, No. 2, Feb. 15, 2004.

(Continued)

*Primary Examiner*—Lester Kincaid
*Assistant Examiner*—Diego Herrera
(74) *Attorney, Agent, or Firm*—Squire, Sanders & Dempsey L.L.P.

(57) ABSTRACT

A method of establishing a conference call in a communication network between a plurality of user terminals each having an identifier. The method comprising receiving a first list of identifiers corresponding to the user terminals with whom the conference call is to be established. At least one of the identifiers represents a second list comprising a plurality of other user terminals each having their own other identifiers. The conference call is established with the user terminals in the first list and the other user terminals represented by the at least one identifier in the first list.

18 Claims, 3 Drawing Sheets

OTHER PUBLICATIONS

Camarillo, G., Ericsson, Roach, A., Dynamisoft; "Providing a Session Initiation Protocol (SIP) Application Server with a List of URIs", IETF Standard Working Draft, Internet Engineering Task Force, CH, No. 2, Mar. 27, 2004.

Koskelainen, P., Khartabil, H., Nokia, "An Extensible Markup Language (XML) Configuration Access Protocol (XCAP) Usage for Conference Policy Manipulation draft koskelainen-xcon-xcap-cpcp-usage-00", IETF, CH, Jun. 20, 2003.

* cited by examiner

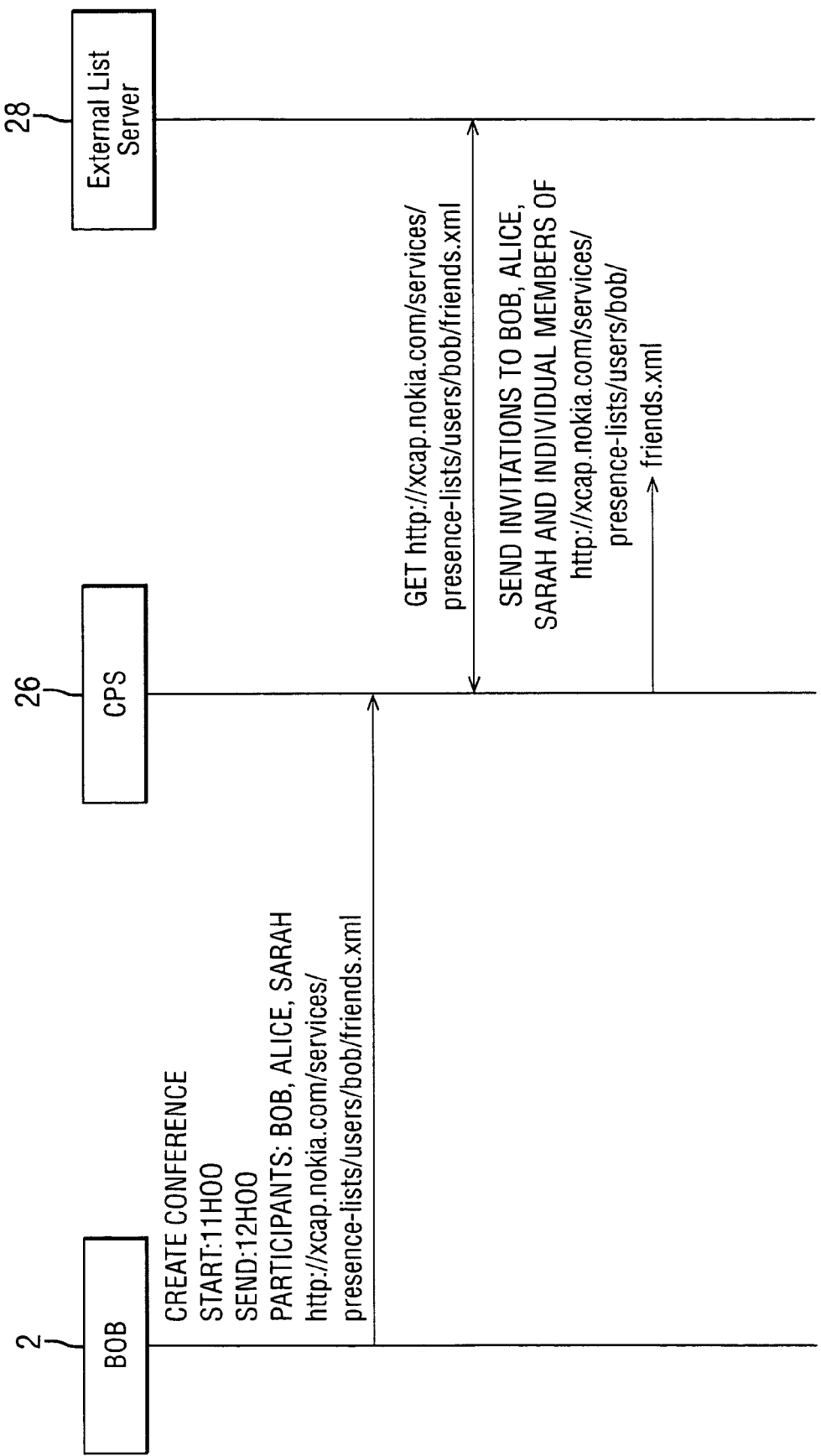

METHOD AND DEVICE FOR ESTABLISHING A CONFERENCE CALL BETWEEN A PLURALITY OF USER TERMINALS OF A COMMUNICATION NETWORK

The present invention relates to establishing a conference call between a plurality of user terminals of a communication network, and in particular but not exclusively in a wireless communications network.

Service providers are constantly seeking to offer additional telecommunication services in order to attract a larger client base. Teleconferencing is one such service that is widely used and which allows people around the world to set up a conference call enabling voice communication over a circuit-switched network such as the PSTN (Public Switched Telecommunication Network).

However, with the emergence of third generation mobile phone technology, it is desirable to offer voice communication over packet-switched networks as well, for example over the Internet and using wireless user terminals (for example, mobile phones). In particular, technologies such as VoIP (Voice over Internet Protocol) have gained widespread appeal. More recent developments such as PoC (Push-to-talk over Cellular) allow users to talk to one another immediately at the push of a button on their user terminals similar to "Walkie Talkie" type operation.

Developments in technologies such as PoC, IMS (IP Multimedia Subsystems) and the Internet all make use of the SIP (Session Initiation Protocol) protocol as defined by the IETF (Internet Engineering Task Force) in their standard RFC 3261. SIP allows for the establishment, handling and release of end-to-end multimedia sessions. There are several additions to the SIP protocol, which specifically allow for conferencing. The SIP conferencing framework defines the mechanisms for multi-party centralized conferencing in a SIP environment. Existing SIP mechanisms allow users, for example, to join and leave a conference.

User terminals are identified by a URI (Uniform Resource Identifier), which allows the SIP protocol to identify each user terminal and control it accordingly. For example, during the establishment, handling and release of a conference call a user terminal can be invited to join a conference, be released from it, etc.

However, developments in other fields for example in "presence" services such as IMPS (Instant Messaging and Presence Services), so called "external lists" are becoming increasing prevalent. An external list can be thought of as a group URI, which means that an external list is a list of users that are grouped together and identified by a group URI. Thus, a group URI is a single URI which identifies a subset of a plurality of other URIs. For example the external list (group URI) "http://xcap.nokia.com/services/presence-lists/users/bob/friends.xml" is representative of a subset of individual members (Jane, Fred, Philip) of the external list. Thus the group URI is representative of a plurality of other users each identified by their own unique URI.

Currently, the standards relating to conferencing which use SIP, are only concerned with URIs for individual users and do not take into account the situation when an external list is used. A disadvantage of this is that the so-called "Dial-out" and "Dial-in" lists used for a conference call, can be unnecessarily large in order to accommodate all of the users that participate in the conference. Also, although externals lists are currently used for other purposes, it might be desirable for a user to utilise lists which he/she has created for multiple services, including conferencing and presence.

Therefore, it is an aim of an embodiment of the present invention to take into account external lists in a conference call, which overcome the aforementioned disadvantages.

According to one aspect of the present invention there is provided a method of establishing a conference call in a communication network between a plurality of user terminals each having an identifier, the method comprising: receiving a first list of identifiers corresponding to those user terminals with whom the conference call is to be established; determining that at least one of the identifiers represents a second list comprising a plurality of other user terminals each having their own other identifiers; retrieving the other identifiers from the second list; and establishing the conference call with the user terminals in the first list and the other user terminals represented by the at least one identifier in the first list.

According to a further aspect of the present invention there is provided a control device for establishing a conference call between a plurality of user terminals of a communication network, each of the user terminals having an identifier and wherein the control device comprising: a first storage location for storing a first list of the identifiers corresponding to the user terminals with whom the conference call is to be established; circuitry for determining that at least one of the identifiers in the first storage location represents a second list comprising a plurality of other user terminals each having their own identifiers; and circuitry for resolving the at least one identifier which represents the plurality of other user terminals and including those other user terminals in the conference call to be established.

For a better understanding of the present invention and to show how the same may be carried into effect, reference will now be made by way of example to the accompanying drawings in which:

FIG. 2 shows message flows according to an embodiment of the present invention;

FIG. 1 shows a plurality of user terminals connected over a communication network 14. That is, a conference call is to be established between the users: Bob 2, Alice 4, Sarah 6, Philip 8, Fred 10 and Jane 12.

Figure 1:
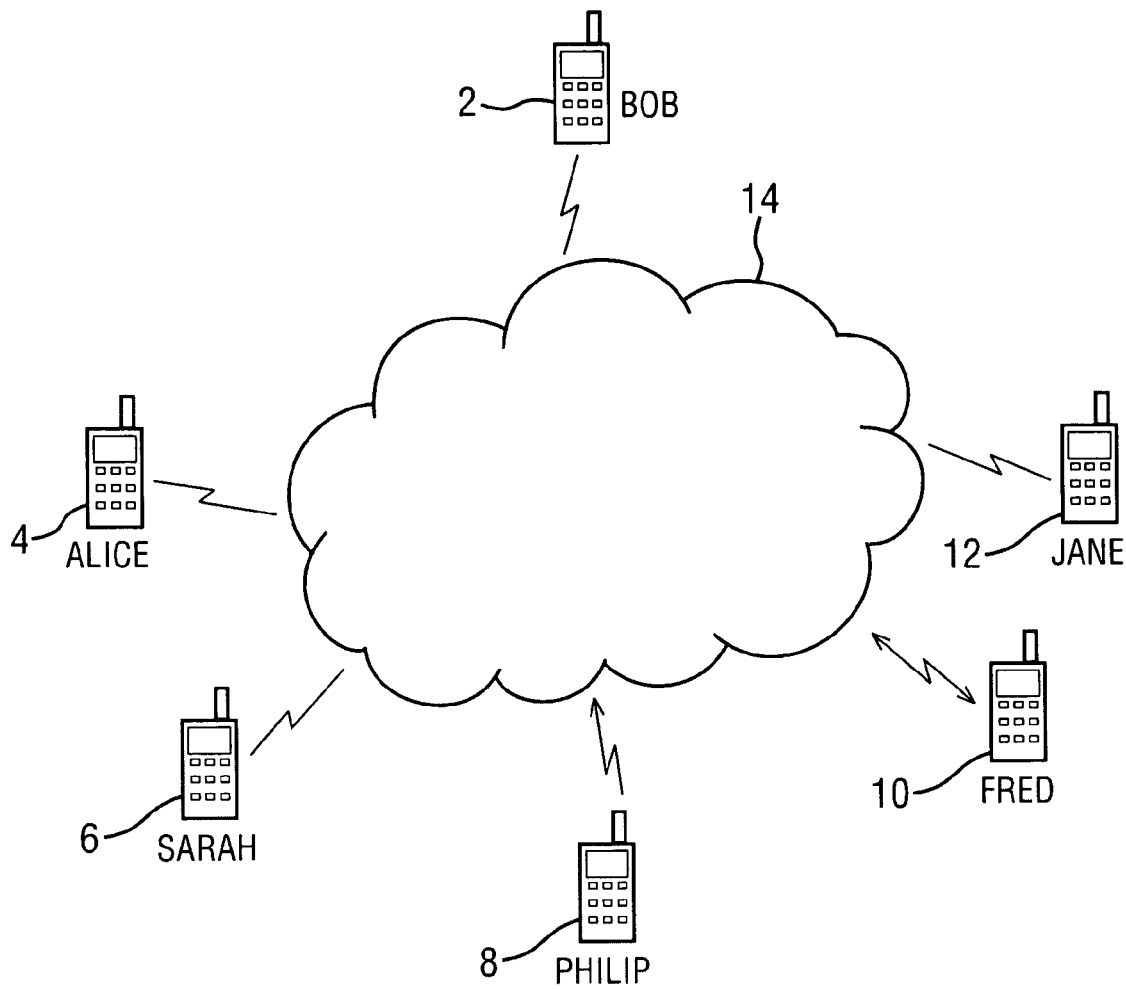
FIG. 1 shows the an example of a conference call being established between a plurality of user terminals.

It is useful to define the various elements for establishing a call using the SIP protocol. Firstly, there is the creator of the conference call, which is a user terminal that sets up the conference call and need not necessarily be one of the user terminal's that is going to take part in the conference itself. The creator provides the details for the conference to the CPS (Conference Policy Server) 26 of the service provider. The creator liaises with a conference server ahead of the call itself in order to establish details such as the time of the call and who the participants are likely to be. In the example shown in FIG. 2 this information is provided on line 20 and includes details such as the time the conference starts (12H00) and the participants involved (Alice, Sarah, http://xcap.nokia.com/services/presence-lists/users/bob/friends.xml). The participants are each specified as a URI (Uniform Resource Identifier), which is an address that can be dialed or reached over a network such as the Internet or any other packet-switched network that supports SIP.

In the example of FIG. 2 the creator is a user terminal Bob 2 which will take part in the conference call. The creator communicates with a conference server 26 which in turn communicates with an external list server 28.

Broadly speaking there are two techniques for establishing a conference call, either using a "dial-out" list or a "dial-in" list.

For a dial-out conference call, the list of the users that are to participate in the conference call are sent to the conference server and stored as a dial-out list 32. At the time that the conference is set to start (i.e. 12H00), the CPS 26 automatically sends invitations, in the form of SIP INVITE messages, to each of the relevant users which are invited to join in the conference.

It should be appreciated that SIP is only an example of one protocol that can be used by a focus (or conference server) to invite users to a conference depending on the URI of the user. Other protocols which satisfy these requirements are equally possible.

For a dial-in conference call, again the creator liaises with the CPS 26 ahead of the conference call itself in order to reserve resources for the call. However, in this situation the creator will supply details of the conference to each of the participating users before the start of the conference. Such information might include: the time which the conference call is to start, an access telephone number, a security PIN number etc. That is, the creator would already have negotiated with the CPS which users are to participate in the call, and these would be stored in a dial-in list 34 in the CPS. In turn, the CPS would provide the creator with the relevant information such as the access telephone number for the conference call service as well as the security PIN number. The creator would then need to supply this information to each of the participating users before the conference call starts. At the time of the call each user will need to call up the access telecommunication number and be prompted to enter an access code. If the user is found to be on the dial-in list stored in the CPS then the user will be accepted to join the conference.

Figure 4:
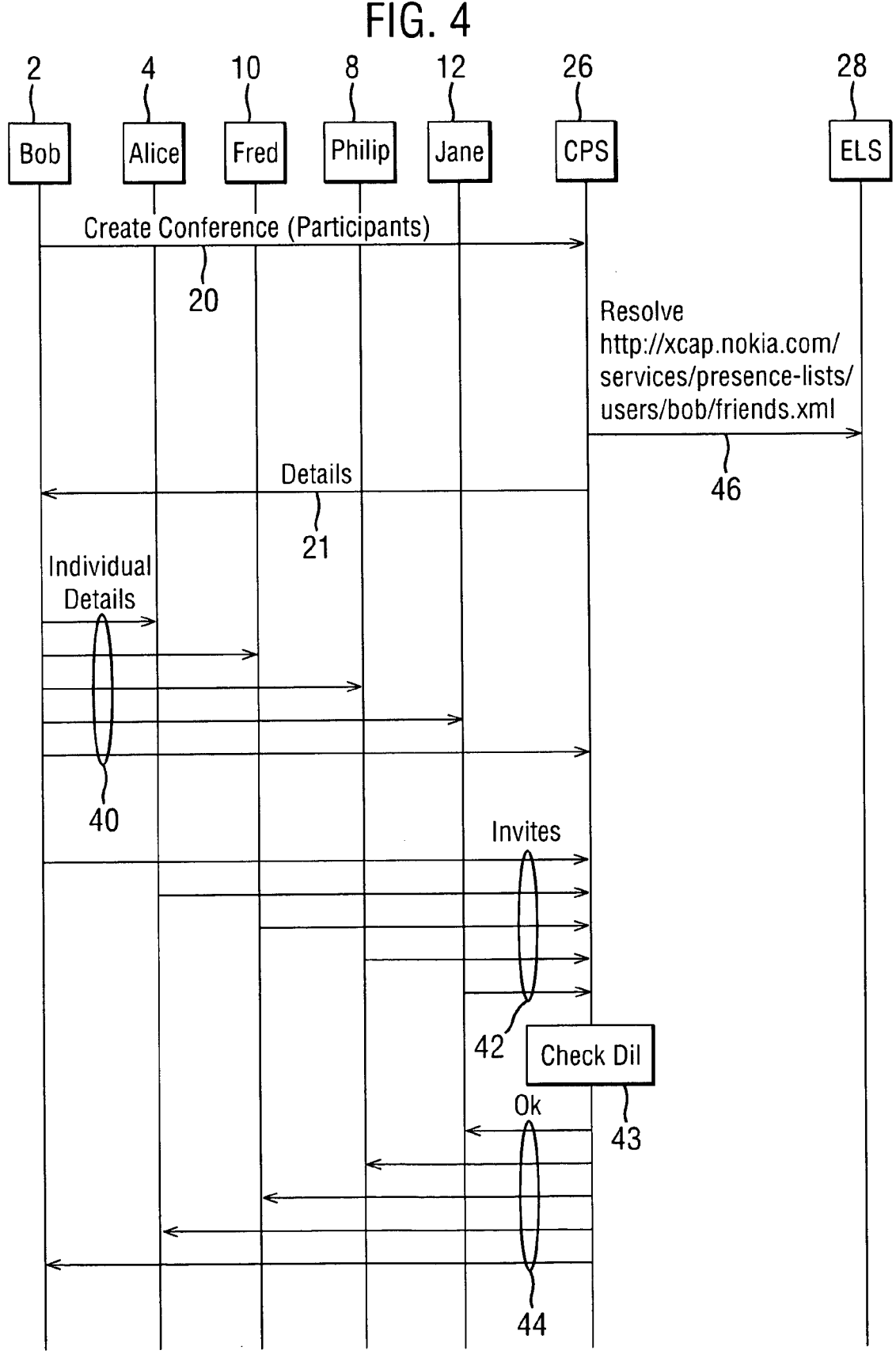
FIG. 4 shows an embodiment of the present invention for the dial-in case.

FIG. 4 shows an embodiment of the present invention for the dial-in case in more detail. In this situation, the creator Bob 2 liaises with the CPS as before. The CPS 26 has circuitry which determines that one of the identifiers in the list of participants is a group URI "http://xcap.nokia.com/services/presence-lists/users/bob/friends.xml", and communicates with the external list server 28 over the interface 46 to resolve which users are contained in the external list addressed by the group URI. It is determined that the users Fred 10, Philip 8 and Jane 12 form part of the group URI. Details are supplied along line 21 from the CPS 26 to the creator Bob 2 which comprise, for example the access number and a security PIN code for the conference.

The creator then sends these details along lines 40 to the respective users and to those users that were resolved from the group URI specifying the external list.

It is then the responsibility of each of the users to send INVITE messages 42 to the CPS at the time of the conference. The CPS 26 receives the INVITE messages and compares these with the URI's of the users stored in the dial-in list at step 43 and the users that are on the dial-in list will then be sent an OK message along lines 44 indicating that they are allowed to participate in the conference call.

Figure 3:
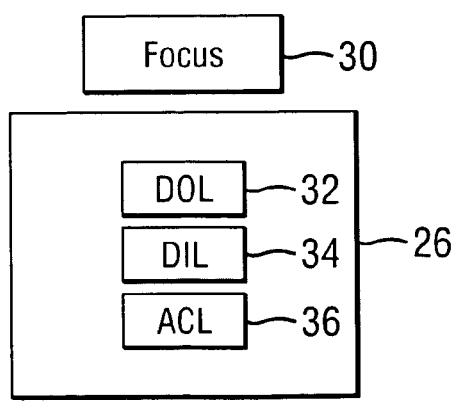
FIG. 3 shows a more detailed representation of the conference server according to an embodiment of the present invention.

FIG. 3 shows a further element known as a focus 30 which communicates with the CPS 26. A conference focus 30 is a SIP user agent that is addressed by a conference URI and identifies a conference, which is a unique instance of a multi-party conversation. The focus maintains a SIP signalling relationship with each participant in the conference. The focus is also responsible for ensuring, in some way, that each participant receives the media that make up the conference. The focus also implements conference policies. The focus performs a logical role such as, for example, inviting users to join a conference. Although the focus is shown as a separate from the CPS 26 in FIG. 3, it should be appreciated that this configuration is flexible and that this logical functionally can reside in the CPS itself in alternative embodiments.

A CP (Conference Policy) is defined as the complete set of rules for a particular conference which is enabled by the CPS (Conference Policy Server) 26. The CPS' role is to implement the membership policy and the media policy. There is an instance of conference policy for each conference. Also, for the dial-out case the CP has the dial-out list 34 which lists the users that a focus invites into the conference at the specified time. The conference policy also contains an ACL (Access Control List) 36 that contains the list of users that are allowed to join a conference (for example those that are authorised to participate in the conference). That is, for the dial-in case the ACL 36 performs the same function as the DIL 34 shown in FIG. 3 and thus the ACL is not required for this case. However, for the dial-out case the CPS can have a DOL 32 and an ACL 36. The CP also allows the creator of the conference to indicate to the focus which users the creator would like the focus to refer to the conference when it starts. The focus then is able to send a SIP REFER request to the corresponding users referring them to the conference.

The CPS is capable of storing and manipulating the CP and in so doing is able to govern the operation of the conference. However, unlike the focus, there is not an instance of the CPS for each conference. Rather, there is an instance of the membership and media policies for each conference.

Thus FIG. 2 shows that the CPS 26 receives the list of URI's identifying the user terminals that will participate in the conference call. The list includes normal URI's, which identify individual user terminals, for example: ALICE and SARAH, and additionally the list comprises a group URI, http://xcap.nokia.com/services/presence-lists/users/bob/friends.xml, which points to an address of an external list that comprises a further subset of URI's each identifying further individual users (Fred, Philip and Jane) which are to participate in the conference call.

Thus the CPS will resolve the group URI which is identified in the received list and will access the subset of further URIs corresponding to the users stored in the external list server 26, which are returned to the CPS. In this way the CPS is able to minimize the size of the dial-in and dial-out lists in the CPS, while still being able to establish a conference call with a large number of users.

Each external list, which is a list of users grouped together, is identified by a single URI and stored on an external list server. At least one protocol for creating such external lists is the XCAP protocol (XML Configuration Access Protocol), which is also the same protocol proposed to create and manipulate the conference policy and is referred to in this regard as the Conference Policy Control Protocol (CPCP).

There is now provided below for each of the dial-in and dial out cases, at least two different embodiments for implementing the resolution of the group URI's of the present invention. The first embodiment uses a SIP URI, whereas the second embodiment uses a XCAP URI. That is, external lists can be placed as a resource in the conference policy dial-out list or dial-in list as follows:

In the dial-out case, the user terminals specified by the external list can be invited into the conference by the focus in alternative embodiments:

1. The creator of the conference places the XCAP URI for the external list URI (assuming that the list was created using the XCAP list usage) into Dial-out list. When it is time for the focus to invite users into the conference, the focus uses the XCAP list URI to retrieve the URIs for the members of the external list. It then sends INVITE (in SIP terms) to the members of that external list. This results in all participants connected to one focus. It should be appreciated that the focus can retrieve the external list at any time as long as the external list is retrieved before the conference starts and can be as soon as the focus is created.

2. The creator of the conference places the SIP URI of the external list into the Dial-out list. When it is time for the focus to invite users into the conference, the focus sends INVITE to the all the members of that dial-out list, including an INVITE to the external list. This INVITE may result in another cascaded conference being created.

For the dial-in case, again there are two embodiments which can implement the present invention:

1. The XCAP URI for the external list is placed into the dial-in list. This enables the focus to retrieve the member URIs in order to determine if a user is allowed to participate in a conference or not.

2. The SIP URI for the external list is placed into the dial-in list. The focus then only accepts participation from the group (they could create a separate conference and try to cascade it into this conference).

The difference between using a SIP URI as compared to an XCAP URI is that the focus does not retrieve the list when a SIP URI is used, rather an XACP URI is needed for this purpose. Instead, with a SIP URI the focus is only able to send an INVITE or accept an INVITE message from it. In this way, the XCAP acts like a pointer to the external list server 28 which contains the list. A SIP URI is assigned to the external list during or after it is created by an XCAP server and addresses the list for SIP communication, for example by sending the external list server an INVITE message.

It should be appreciated that although the embodiment of FIG. 2 refers to an XCAP URI such as http://xcap.nokia.com/services/presence-lists/users/bob/friends.xml, a SIP URI such as friends@nokia.com can also be used.

According to one embodiment of the invention the focus does not change anything if the external list changes. Instead the focus only deals with the copy it fetched. This copy is not necessarily consistent. For example, if a second conference instance occurs, then the focus will need to fetch a copy of the external list again.

It should be appreciated that the URIs identify the user, not the terminal itself and therefore a user may move to a different user terminal and still participate in the conference call.

The invention claimed is:

1. A method comprising:
   receiving a first list of identifiers corresponding to a plurality of user terminals with which a conference call is to be established;
   determining, by a control device, that at least one identifier represents a second list comprising a plurality of other user terminals each having their own other identifiers;
   retrieving the other identifiers from the second list;
   establishing the conference call, in a communication network, with the plurality of user terminals in the first list and the plurality of other user terminals represented by the at least one identifier in the first list; and
   allowing the user terminals corresponding to identifiers from the first and second lists to participate in the conference call if the identifiers are on an access control list.

2. The method of claim 1, wherein the first list is stored as a dial-out list and wherein the establishing the conference call comprises automatically sending to the plurality of user terminals identified in the dial-out list, invitation messages to participate in the conference call.

3. The method of claim 2, wherein the determining comprises determining that an Extensible Markup Language Configuration Access Protocol (XCAP) identifier represents the second list, and wherein the XCAP identifier is in the dial-out list.

4. The method of claim 2, wherein the determining comprises determining that a Session Initiation Protocol (SIP) identifier represents the second list, and wherein the SIP identifier is in the dial-out list.

5. The method of claim 1, wherein the first list is stored as a dial-in list, and wherein the method further comprises requesting participation in the conference call by means of user terminals; and wherein the establishing the conference call comprises sending to those user terminals identified in the dial-in list that requested participation, invitation messages to participate in the conference call.

6. The method of claim 5, wherein the determining comprises determining that an Extensible Markup Language Configuration Access Protocol (XCAP) identifier represents the second list, and wherein the XCAP identifier is in the dial-in list.

7. The method of claim 5, wherein the determining comprises determining that a Session Initiation Protocol (SIP) identifier represents the second list, and wherein the SIP identifier is in the dial-in list.

8. The method of claim 5, wherein the at least one identifier representing the second list points to an address of a storage location of the second list of the plurality of other user terminals.

9. The method of claim 8, wherein the storage location of the second list is an external list server which is external to a control device.

10. The method of claim 1, wherein the receiving comprises receiving a first list of identifiers corresponding to a plurality of user terminals with which a conference call is to be established in a wireless communication network.

11. The method of claim 1, wherein the receiving comprises receiving a first list of identifiers corresponding to a plurality of mobile phones.

12. The method of claim 1, wherein the receiving comprises receiving a first list of Uniform Resource Identifiers (URI).

13. The method of claim 1, wherein the establishing comprises establishing the conference call in the communication network using Session Initiation Protocol (SIP) messages.

14. A control device, comprising:
   a first storage location configured to store a first list of identifiers corresponding to a plurality of user terminals with which a conference call is to be established;
   circuitry configured to determine that at least one identifier in the first storage location represents a second list comprising a plurality of other user terminals each having their own identifiers; and
   circuitry configured to resolve the at least one identifier which represents the plurality of other user terminals, allowing the user terminals corresponding to identifiers from the first and second lists to participate in the conference call if the identifiers are on an access control list and including the plurality of other user terminals in the conference call to be established,
   wherein the control device is configured to establish the conference call between the plurality of terminals of a communication network.

15. The control device of claim 14, wherein the control device is configured to receive the first list from a user terminal responsible for setting up the conference call, and wherein the control device is configured to send the first list along with an indication of a time at which the conference call is to be established.

16. The control device of claim 14, wherein the control device is configured to cooperate with an external list server which stores the second list by retrieving the second list therefrom.

17. A control device comprising:
   receiving means for receiving a first list of identifiers corresponding to a plurality of user terminals with which a conference call is to be established;
   determining means for determining that at least one identifier represents a second list comprising a plurality of other user terminals each having their own other identifiers;
   retrieving means for retrieving the other identifiers from the second list; and
   establishing means for establishing the conference call, in a communication network, with the plurality of user terminals in the first list and the plurality of other user terminals represented by the at least one identifier in the first list and allowing the user terminals corresponding to identifiers from the first and second lists to participate in the conference call if the identifiers are on an access control list.

18. A communications network comprising:
   a plurality of user terminals; and
   a control device configured to establish a conference call between the plurality of user terminals, each of the user terminals having an identifier and wherein the control device comprises
   a first storage location configured to store a first line of the identifiers corresponding to the user terminals with whom the conference call is to be established;
   circuitry configured to determine that at least one of the identifiers in the first storage location represents a second list comprising a plurality of other user terminals each having their own identifiers; and
   circuitry configured to resolve the at least one identifier which represents the plurality of other user terminals, allowing user terminals corresponding to the identifiers from the first and second lists to participate in the conference call if the identifiers are on an access control list and including those other user terminals in the conference call to be established.

* * * * *